UNITED STATES PATENT OFFICE.

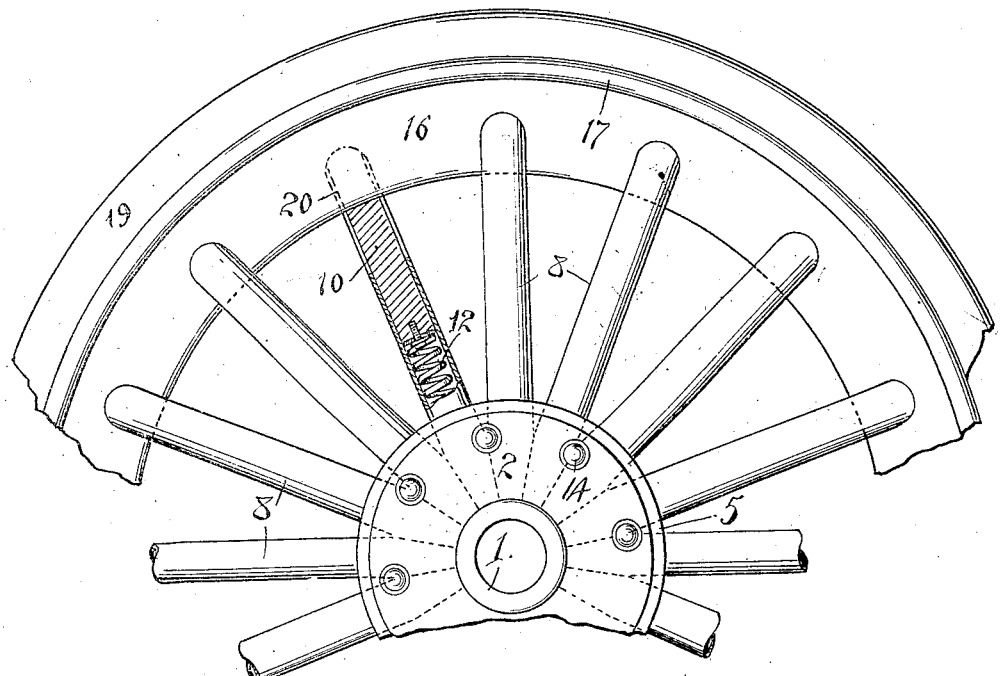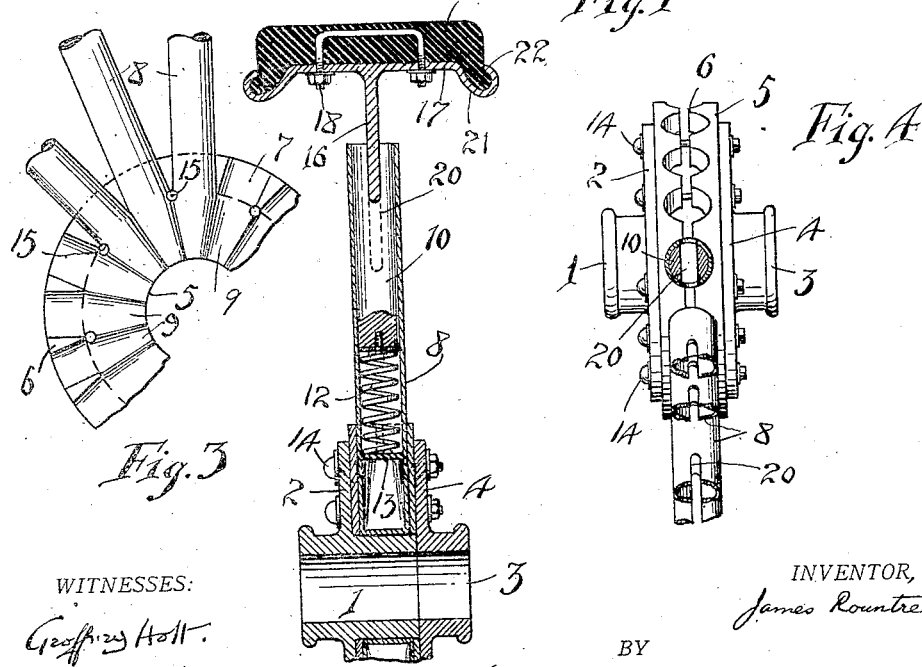

JAMES ROUNTREE, OF BERKELEY, CALIFORNIA.

RESILIENT WHEEL.

939,748.  Specification of Letters Patent.  Patented Nov. 9, 1909.

Application filed July 27, 1908. Serial No. 445,676.

*To all whom it may concern:*

Be it known that I, JAMES ROUNTREE, a citizen of the United States, residing at Berkeley, in the county of Alameda and State of California, have invented new and useful Improvements in Resilient Wheels, of which the following is a specification.

The object of the present invention is to provide an improved form of resilient wheel, especially adapted for use in automobiles, in order to dispense with the necessity of using pneumatic tires, which are a source of great expense, trouble, and danger.

In the accompanying drawing, Figure 1 is a broken side view of my improved wheel; Fig. 2 is a broken axial section thereof; Fig. 3 is a broken side view of one of the rings showing the inner ends of several spokes; Fig. 4 is a plan view of the hub, certain of the spokes being removed.

Referring to the drawing, 1 indicates a comparatively long hub section having a flange 2, extending therefrom intermediate of the ends thereof, and 3 indicates a second and shorter hub section having a flange 4 extending from the inner end thereof.

5 indicates rings formed with crown flanges 6, extending toward each other, and formed on their inner edges with rounded sockets 7 to receive the cylindrical portions of hollow spokes 8. Said rings are also formed with tapering recesses 9 to receive the tapering ends of said spokes, said taper, however, being only in the circumferential direction of the wheel, as indicated in Fig. 3, and not in the axial direction thereof. Within the cylindrical hollow spokes reciprocate plungers 10 which are normally pressed outward by coiled springs 12 interposed between the ends of the plungers and transverse partitions 13 formed in said spokes. The plungers fit sufficiently close within the hollow spokes that the air cannot readily escape from between the inner ends of the plungers and the partitions, and thus the air forms a cushion for the plunger, in addition to the spring 12. The spokes are secured in place in the rings and the cup sections by means of bolts 14 which pass through notches or recesses 15 formed in the sides of the spokes. The plungers press at their outer ends against an annular web 16 formed upon a rim 17, upon which is secured, by U-bolts 18, a solid rubber tire 19. The outer ends of the spokes are slotted, as shown at 20, to permit said web to reciprocate, with the plungers, in said spokes. The rim 17 is formed with a central portion which is flat in an axial or transverse direction, and with marginal portions 21 which recede from the central flat portion and the edges of which are bent back on themselves to form lips 22 to engage the rubber tire 19 and hold it in place. These lips 22 do not project farther from the center of the wheel than the central flat portion, so that, in case of necessity said tire can be removed and the wheel can run upon its rim alone, the central flat portion thereof being then in contact with the road. At the bottom of the wheel, the web 16 moves upward in the slots 20 pressing the plungers 10 up therein, and at the top of the wheel, the web 16 recedes upward in the slots 20 of the spokes 8, the plungers 10 following. Intermediate between the top and bottom, the web slides through the slots of the spokes transversely to the plungers.

By the above construction I provide a wheel possessed of great resiliency, both pneumatic and metallic; which is so constructed as to provide great resistance against side strains transmitted from the rim to the hub; which can be readily taken apart and assembled; which is comparatively cheap in construction; and which will not easily get out of order.

I claim:—

A wheel having a hub, radial hollow spokes fixedly secured to said hub, coiled springs therein, reciprocating plungers within the spokes, pressed outward by said springs, and a rim having an annular inwardly extending web, the spokes being slotted at their outer ends to receive said web, and the web of said rim being loosely received within said slotted ends in contact with the outer ends of the plunger, substantially as described.

In testimony whereof I have hereunto set my hand in the presence of two subscribing witnesses.

JAMES ROUNTREE.

Witnesses:
FRANCIS M. WRIGHT,
D. B. RICHARDS.